US007624393B2

(12) United States Patent
Egan et al.

(10) Patent No.: US 7,624,393 B2
(45) Date of Patent: Nov. 24, 2009

(54) COMPUTER APPLICATION AND METHODS FOR AUTONOMIC UPGRADE MAINTENANCE OF COMPUTER HARDWARE, OPERATING SYSTEMS AND APPLICATION SOFTWARE

(75) Inventors: Carol Ann Egan, Rochester, MN (US); Earl Walter Emerick, Rochester, MN (US); Thomas Alan Shore, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1148 days.

(21) Appl. No.: 10/665,656

(22) Filed: Sep. 18, 2003

(65) Prior Publication Data

US 2005/0066019 A1     Mar. 24, 2005

(51) Int. Cl.
*G06F 9/44* (2006.01)
*G06F 9/445* (2006.01)

(52) U.S. Cl. .................. 717/173; 717/169; 717/175; 717/178

(58) Field of Classification Search .............. None
See application file for complete search history.

(56) References Cited

U.S. PATENT DOCUMENTS

| 6,457,076 | B1 * | 9/2002 | Cheng et al. ............... 710/36 |
| 6,832,371 | B1 * | 12/2004 | Hussey .................... 717/165 |
| 7,073,172 | B2 * | 7/2006 | Chamberlain ............. 717/169 |
| 7,366,685 | B2 * | 4/2008 | Emerick et al. ............ 705/26 |
| 2004/0031029 | A1 * | 2/2004 | Lee et al. ................. 717/171 |
| 2004/0060035 | A1 * | 3/2004 | Ustaris .................... 717/100 |
| 2004/0237068 | A1 * | 11/2004 | Ren ......................... 717/110 |
| 2005/0066019 | A1 * | 3/2005 | Egan et al. ................ 709/223 |
| 2005/0132350 | A1 * | 6/2005 | Markley et al. ............ 717/168 |

OTHER PUBLICATIONS

"SafePatch Version 0.9 User Manual", Mar. 1999. Online retrieved at <www.osti.gov/bridge/product.biblio.jsp?osti_id=9824>.*
"Software update via mobile agent based programming", Bettini et al., Dec. 2002, pp. 32-36. Online retrieved at <http://delivery.acm.org/10.1145/510000/508800/p32-bettini.pdf>.*
"Dynamic software updating", Hicks et al., Dec. 2001, pp. 13-23. Online retrieved at <http://delivery.acm.org/10.1145/380000/378798/p13-hicks.pdf>.*
"Patch on Web objects", Tiow et al., Apr. 2003, pp. 221-224. Online retrieved at <http://ieeexplore.ieee.org/stamp/stamp.jsp?tp=&arnumber=1209072&isnumber=27215>.*

* cited by examiner

*Primary Examiner*—Tuan Q Dam
*Assistant Examiner*—Thuy Dao
(74) *Attorney, Agent, or Firm*—James R. Nock (57) ABSTRACT

The present invention provides methods and a computer-readable program for providing autonomic, event driven upgrade maintenance of one or more software modules residing on a computer system. In a preferred embodiment, a method begins by detecting a predefined triggering event on the computer system indicative of a potential maintenance issue. Next the computer system connects to an upgrade management server, where the upgrade maintenance server creates a list of recommended upgrade modules to download to the computer system, the list based upon the triggering event and a set of selection policies. The method then downloads the list of recommended upgrade modules from the upgrade management server to the computer system, and selectively installs upgrade modules chosen from the list of recommended upgrade modules on the computer system. The user is then notified of the status of the upgrade maintenance operation.

53 Claims, 4 Drawing Sheets

COMPUTER APPLICATION AND METHODS FOR AUTONOMIC UPGRADE MAINTENANCE OF COMPUTER HARDWARE, OPERATING SYSTEMS AND APPLICATION SOFTWARE

FIELD OF THE INVENTION

The present invention relates generally to the application of software upgrades, and more specifically relates to a computer program product and associated methods for autonomically applying upgrades to computer hardware drivers, operating systems, and application software.

BACKGROUND OF THE INVENTION

The software industry is constantly rewriting and improving the products it sells. Often, upgraded versions of software are "bug fixes" built to fix some problem that the previous upgrade introduced. Some upgrades add features that users were requesting or that a software developer thought would be desirable. Other upgrades are built to increase a program's compatibility with hardware upgrades or some other piece of software that has already been upgraded.

With the explosive growth of Internet access, many software applications and operating systems include an automatic update tool that will periodically check on the software manufacturer's Internet site to see if the current version of the software application running on a user's system is the latest version. If not, a mechanism exists for downloading and installing the latest version of the software application on the user's system.

There are several potential shortcomings in these automatic update tools. First, a user might not need the new features that are offered in the upgrade. Second, the potential exists that the newest version of the software application may introduce more problems than are fixed by the upgrade. Also, many users have relatively low-bandwidth connections to download such upgrades. The blossoming size of software packages has made many of these downloads take an unreasonable amount of time on a standard dial-up Internet connection. Also, there is often no indication of how big the update will be until it is actually started.

As a result, many computer and server users do not keep current with the latest hardware and software upgrades for their system, and subsequently experience problems that could have been avoided. Many of the upgrades really are a boon, particularly bug fixes or security updates that patch holes that can make computers vulnerable to mischief. In addition, those users that do keep up with upgrades spend a considerable amount of time looking for new upgrades. They also spend significant time evaluating each new upgrade to determine if it is applicable to their specific environment and whether it has been sufficiently tested or "burned-in" in live environments (i.e., to avoid problems caused by a defective or incompatible code upgrade).

There is a need for a computer program product and method to provide autonomic upgrade maintenance of computer hardware, operating systems and application software. This program product and method should provide a highly configurable, efficient, event-driven method of automating this upgrade-related search and delivery function. The program product/method should utilize a variety of existing data sources and combine several actions with a set of configurable business rules to perform the various tasks within parameters set by the user.

SUMMARY OF THE INVENTION

The present invention provides methods and a computer-readable program for providing autonomic, event driven upgrade maintenance of one or more software modules residing on a computer system. In a preferred embodiment, a method begins by detecting a predefined triggering event on the computer system indicative of a potential maintenance issue. Next the computer system connects to an upgrade management server; where the upgrade maintenance server creates a list of recommended upgrade modules based upon the triggering event and a set of selection policies to download to the computer system. The method then downloads the list of recommended upgrade modules from the upgrade management server to the computer system, and selectively installs upgrade modules chosen from the list of upgrade modules on the computer system. The user is then notified of the status of the upgrade maintenance operation.

In varying embodiments of the present invention, the triggering events may include, but are not limited to, a change to the hardware configuration of the computer system, a change to the software configuration of the computer system, exceeding a predefined error threshold value on the computer system, exceeding a user selectable, predefined performance threshold on the computer system, and exceeding a predefined elapsed time since the last connection to the upgrade management server. The computer software maintained by the method can include software applications, operating systems, and device drivers for installed hardware components.

In an exemplary embodiment of the present invention, the method steps of connecting to an upgrade management server and selectively installing the list of recommended upgrade modules are controlled by a set of user defined policies. In varying embodiments, the set of user defined policies includes: a preferred connection time, a connection resource to be used, a specification of computer system areas/software products to enable automatic application of upgrades, a defined time to connect to the upgrade management server to check for upgrades, a defined elapsed time interval for connecting to the upgrade management server to check for upgrades, an e-mail list for notifying users of information and actions relative to the upgrade management process, and a list of one or more upgrade management servers to be used for the upgrade management process.

In varying embodiments of the present invention, the set of selection policies includes: creating the list of recommended upgrade modules based upon a specific set of upgrades requested by the computer system, comparing the revision levels of the software modules residing on the computer system against the revision levels of the same software modules residing on the upgrade management server, creating the list of recommended upgrade modules by identifying modules associated with a hardware change on the computer system, creating the list of recommended upgrade modules by identifying software modules associated with a software change of the computer system, creating the list of recommended upgrade modules by identifying upgrades specifically associated within an error triggering event on the computer system, creating the list of recommended upgrade modules by identifying upgrades specifically associated with a performance triggering event on the computer system, creating the list of recommended upgrade modules by analyzing a problem history provided by the computer system, or analyzing and comparing similar problem histories and/or operating environment with others tracked by the fix management server or other means provided by the vendor, and creating the list of recommended upgrade modules by identifying compatible revision levels between two or more software modules included within the list of modules.

The foregoing and other features and advantages of the invention will be apparent from the following more particular description of preferred embodiments of the invention, as illustrated in the accompanying drawings.

DETAILED DESCRIPTION OF THE PREFERRED EMBODIMENTS

The present invention provides an automated process of checking for upgrades that apply to a user's environment on a computer system, downloading these upgrades from an upgrade management server, and if the user allows, applying the upgrades at a predetermined time that is best for the user. The present invention uses many existing data sources and combines several actions with configurable business rules to perform the various tasks within parameters set by the user. In a preferred embodiment, the present invention fits within IBM Corporation's eServer Hardware Management Console (HMC); however the present invention would also work well in a wide variety of software upgrade management environments (i.e., in the central server for a group of servers). In varying embodiments, the upgrades managed by this service application include, but are not limited to: middleware, operating systems, platform and I/O upgrades, as well as related Independent Software Vendors (ISVs) and other business partner software.

Figure 1:
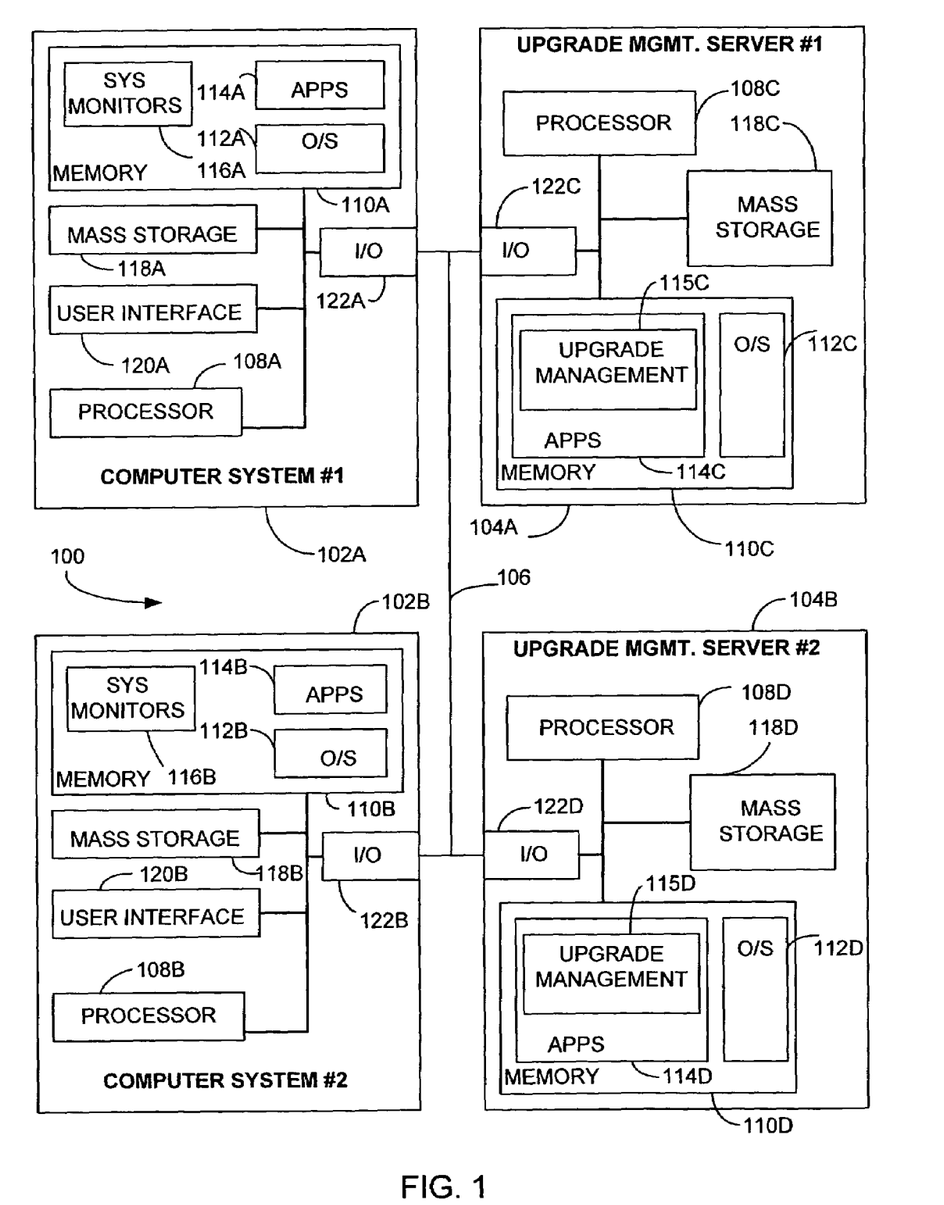
FIG. 1 illustrates an exemplary computing environment in which the present invention operates.

FIG. 1 illustrates an exemplary computing environment 100 in which the present invention operates. Computing environment includes one or more computer systems 102A, 102B which are coupled to one or more upgrade management servers 104A, 104B via a network connection 106. Computer systems 102A, 102B include at least one processor 108A, 108B coupled to a memory 110A, 110B. Memory 110A, 110B includes one or more software modules such as an operating system 112A, 112B, software applications 114A, 114B, and system monitors (i.e., environment collectors) 116A, 116B for monitoring the operation of the computer system. Computer systems 102A, 102B also typically include one or more mass storage devices 118A, 118B (e.g., hard disk drives, optical drives, etc.), a user interface 120A, 120B, and an I/O interface 122A, 122B for providing connectivity with other devices in the computing environment.

Upgrade management servers 104A, 104B include at least one processor 108C, 108D coupled to a memory 110C, 110D. Memory 110C, 110D includes an operating system 112C, 112D and one or more software applications 114C, 114D. Software applications 114C, 114D include an upgrade maintenance application 115C, 115D for controlling the automatic upgrade management method provided by the present invention. Upgrade management servers 104A, 104B also typically include one or more mass storage devices 118C, 118D, and an I/O interface 122C, 122D for providing connectivity with other devices within the computing environment 100.

User and vendor supplied system monitors 116A, 116B on computer systems 102A, 102B interface with upgrade maintenance application 115C, 115D to monitor the operating state of the computer systems. A number of potential operating conditions may be monitored, including but not limited to: hardware configuration changes and new installations, software configuration changes and new installations, the number of errors detected, performance triggers, etc. Based on changes in the operating conditions of computer system 102A, 102B, a triggering event is generated, which is then detected by system monitor 116A, 116B (e.g., environment collector) and a connection is established with upgrade management application 115C, 115D residing on upgrade management server 104A, 104B. In a preferred embodiment, a set of user defined policies controls the connection (e.g., the preferred connection time, the connection resource to be used (dial-up, wireless, Virtual Private Network (VPN) etc.) and the elapsed time period used for periodic update checking, etc.). A triggering event may also be generated by exceeding a predefined elapsed time since the last connection to the upgrade management server 104A, 104B (i.e., periodically checking the upgrade management server for recommended upgrades).

Based on the detection of the triggering event, upgrade management application 115C, 115D contains the logic necessary to invoke the proper actions (e.g., creating a recommended list of upgrade modules to apply to computer system 102A, 102B). These actions can be table driven and delivered as a web service to upgrade management server 104A, 104B so as to provide the latest and most accurate actions for a particular condition. Actions can also be supplied by other vendors for their own products, or the user of the computer system 102A, 102B for operations management of the user's proprietary applications.

In a preferred embodiment, the upgrade management application 115C, 115D creates a list of recommended upgrade modules to download to computer systems 102A, 102B, based on the triggering event detected by system monitors 116A, 116B and a set of predefined selection policies.

After the list has been created, the list of recommended upgrade modules are downloaded from the upgrade management server 104A, 104B to computer system 102A, 102B. Once the upgrade management list/upgrade modules have been downloaded to computer system 102A, 102B, the installation of the modules can be done automatically, or can be performed by the user. In a preferred embodiment, a set of user defined policies selectively controls which modules are installed on the computer system 102A, 102B, when the modules are installed, and where they are installed. The upgrade modules themselves can be downloaded at the time the recommended list of upgrade modules is downloaded, or alternatively can be selectively downloaded after the set of user policies (or the user) chooses which of the modules present on the list of recommended upgrade modules should be installed. The user of the computer system 102A, 102B can be also be notified of the status of the upgrade maintenance operation currently underway or just completed via a console message or e-mail message.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer readable signal bearing media used to actually carry out the distribution. Examples of suitable signal bearing media include: recordable type media such as floppy drives and CD RW, and transmission type media such as digital and analog communications links.

Figure 2:
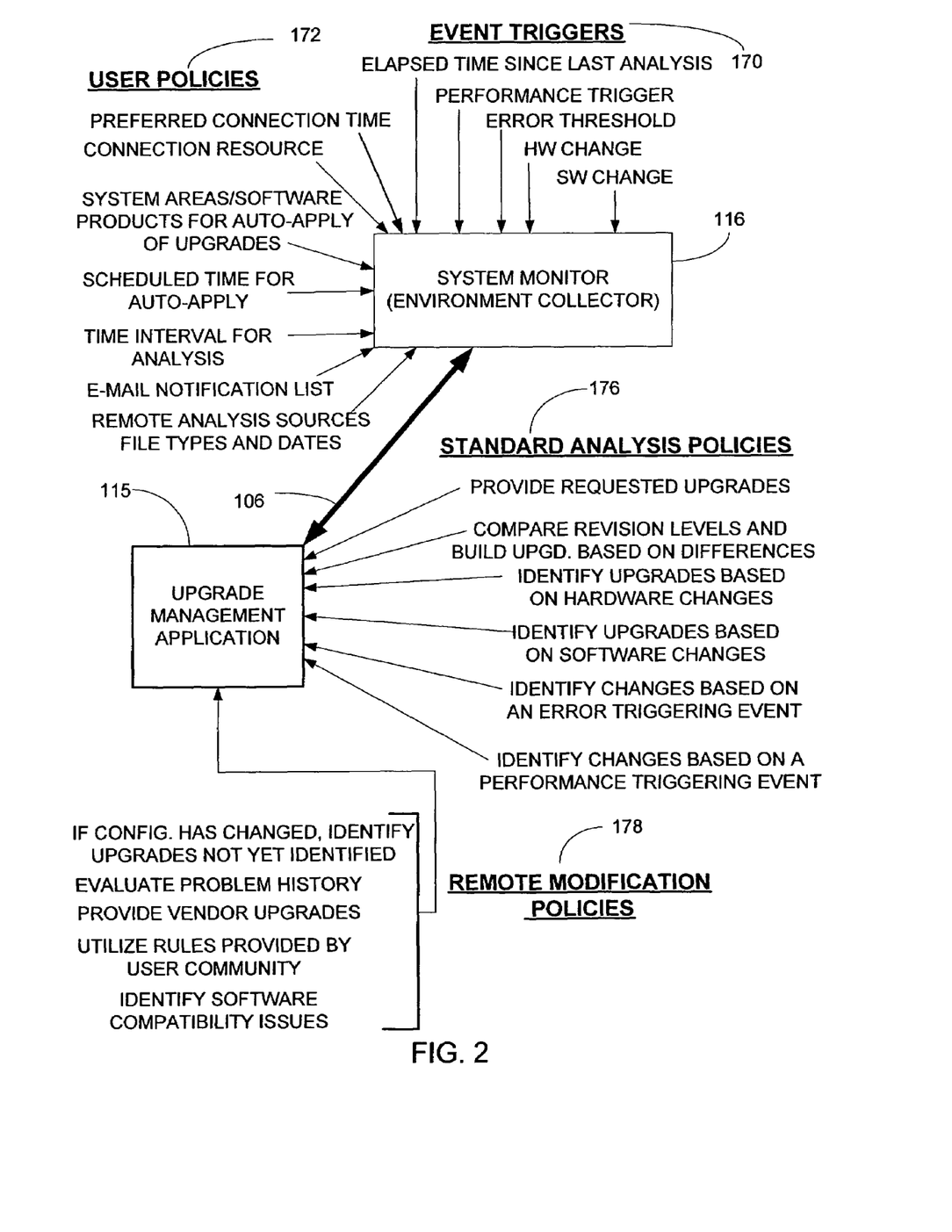
FIG. 2 is a block diagram showing the interaction between a system monitor (e.g., environment collector) residing on a computer system and an upgrade management application residing on an upgrade management server.

FIG. 2 illustrates a block diagram showing the interaction between the system monitor (e.g., environment collector) 116 residing on the computer system 102 and the upgrade management application 115 residing on the upgrade management server 104.

The system monitor (e.g., environment collector) 116 constantly monitors the computer system 102 for event triggers 170 that indicate that an upgrade management analysis is necessary. Examples of event triggers 170 include, but are not limited to: changes in the hardware configuration of the computer system 102, changes in the software configuration of the computer system 102, exceeding a predefined error threshold count on the computer system 102, exceeding a predefined threshold level of the computer system 102, and exceeding a predefined elapsed time since the last connection to the upgrade management server 104 (i.e., periodically checking the upgrade management server for updates).

Once a triggering event is initiated, the system monitor initiates actions based on a set of user defined policies 172. The user defined policies 172 include policies directed toward both connecting to the upgrade management server 104 and selectively installing a list of recommended upgrade modules returned by the upgrade management server 104 to computer system 102. It is possible that user defined policies 172 will be defined such that none of the list of recommended upgrade modules returned by the upgrade management server 104 to the computer system 102 will be selected to be installed. Examples of user defined policies 172 include: a preferred connection time for connecting to the upgrade management server 104, the connection resource to be utilized, the specific computer system areas/software products to enable auto-application of upgrades, the scheduled day/time for auto applying upgrades to computer system 102, the elapsed time interval for doing periodic connection to the upgrade management server 104 to check for updates, a specific defined time to connect to the upgrade management server 104 to check for updates, an e-mail notification list to notify a set of users of any upgrade management activity, sources to be used for remote analysis (i.e., which upgrade management servers 104 to connect to for updates, the type of upgrades (e.g., device drivers, operating systems, software applications), and the age of the upgrades (i.e., how long since burn-in).

The access to the recommended upgrades from computer system 102 to upgrade management server 104 can be performed via a variety of network connections 106. Examples of such network connections include, but are not limited to: VPN, dial-up, and wireless. Upgrade management application 115 analyzes the triggering event, along with a set of predefined selection policies in order to create a list of recommended upgrade modules to download to the computer system 102. In other words, upgrade management application 115 performs its analysis and builds a list of recommended upgrades based on triggering information provided by the computer system 102 and a set of selection policies predefined by the user.

Selection polices include standard analysis policies 176 requested by the computer system 102, and also remote modification policies 178 based on environment. Examples of standard analysis policies 176 include, but are not limited to: creating the list of recommended upgrade modules based upon a specific set of upgrades requested by the computer system 102, comparing revision levels of software modules residing on the computer system 102 against the revision levels of modules residing on the upgrade management server 104 and building the list based on the differences between the levels, identifying modules associated with a hardware change on the computer system 102, identifying modules associated with a software change on the computer system 102, identifying upgrades specifically associated with an error triggering event on the computer system 102, and identifying upgrades specifically associated with a performance triggering event on the computer system 102.

Remote modification policies 178 include, but are not limited to: (1) if the new or reported inventory of software/hardware on computer system 102 is different than the last saved configuration of computer system 102, identifying and downloading unique upgrades not already identified; (2) evaluating a reported problem history provided by computer system 102; (3) if vendor software is reported on the inventory provided by computer system 102, then providing a list of upgrades based on information provided by the vendor; (4) building the upgrade list based upon rules maintained by the support community to execute specific analysis based on known information; and (5) building the upgrade list using rules defined to identify compatibility issues between various levels of software (i.e., cross-check versions of various software present on computer system 102 against any identified module updates to insure the module updates are compatible with other software modules/applications residing on the computer system before downloading/installing them).

Figure 3A:
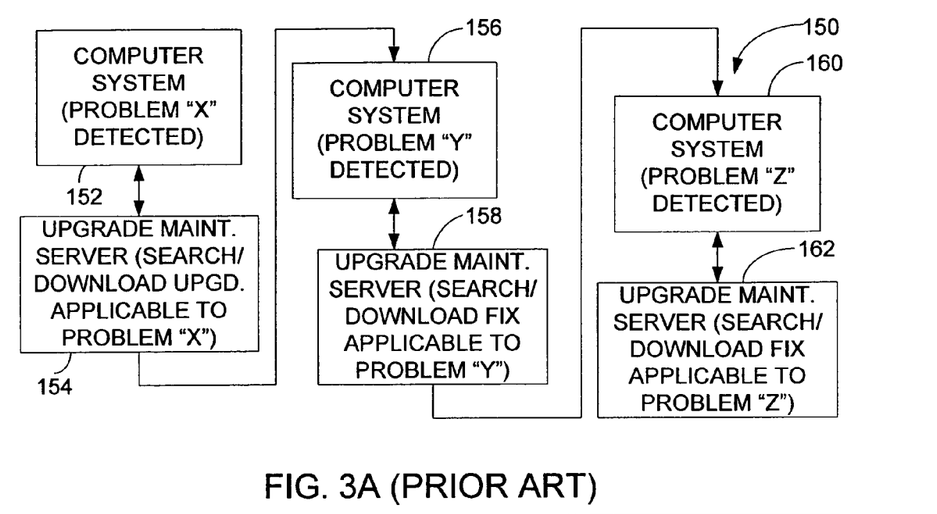
FIG. 3A is a prior art flow diagram illustrating an example of the steps required to apply an upgrade maintenance to a computer system.

FIG. 3A is a prior art flow diagram illustrating an example of the steps required to apply an upgrade maintenance to a computer system 102, shown generally at 150. In the illustrated example, a problem "x" is detected by a user on computer system 102, as shown at block 152. After the problem is detected, computer system 102 connects with a upgrade management server 104 in order to find and download a upgrade specifically directed to problem "x" (e.g., FIX-x), as shown at block 154. In the illustrated example, the downloaded upgrade related to problem "x" (e.g., FIX-x) introduces a new problem "y" on computer system 102, as a result of incompatibility with one or more other software modules residing the computer system, as shown at block 156. As a result, computer system 102 is forced to connect with upgrade management server 104 for a second time, this time downloading a second upgrade (e.g., FIX-y) required to solve the incompatibility introduced when FIX-x was previously installed, as shown at block 158. While the installation of FIX-y fixes the compatibility problem introduced by FIX-x, it is determined that the performance of computer system 102 has fallen below a minimum acceptable standard (i.e., problem "z", as shown at block 160). As a result, computer system 102 is forced to connect with upgrade maintenance server 104 for a third time in order to try to find an upgrade that will solve the performance problem related to the installation of FIX-y. In this instance, there is a FIX-z available which will solve the performance problem, as shown at block 162. So, FIX-z is downloaded from upgrade management server 104 to computer system 102, and FIX-z is installed. In summary, three separate connections/transactions were required between computer system 102 and upgrade management server 104 in order to perform the upgrade maintenance.

Figure 3B:
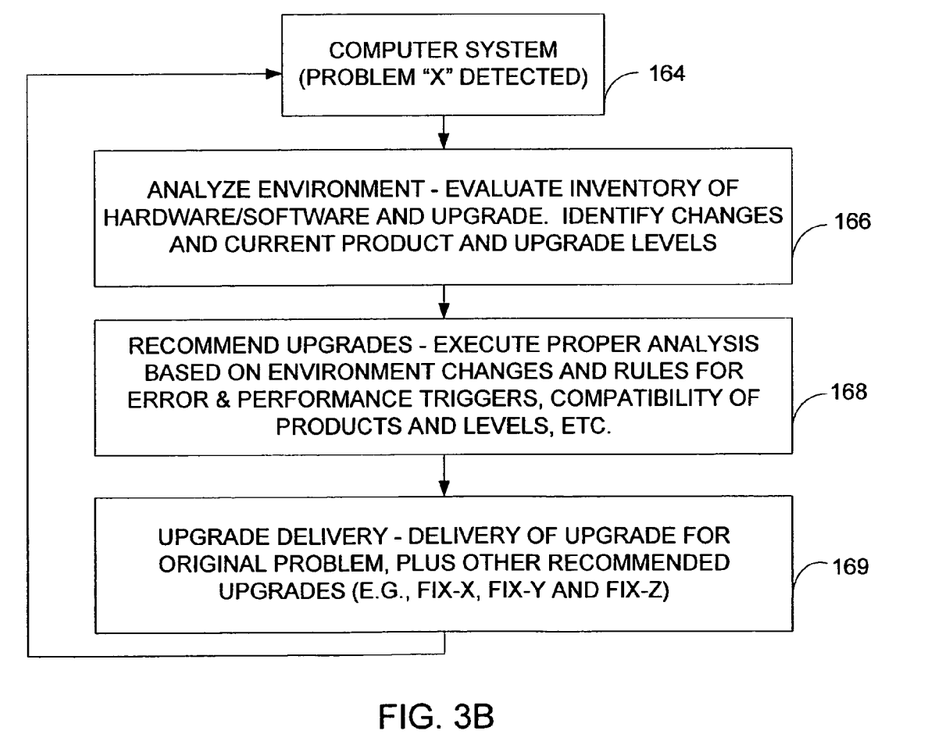
FIG. 3B illustrates an upgrade management operation in accordance with the present invention where all upgrade management operations required by a computer system can be accomplished in a single connection/transaction with an upgrade management server.

In contrast to the prior art example illustrated in FIG. 3A, FIG. 3B illustrates an upgrade management operation in accordance with the present invention where all upgrade management operations required by computer system 102 can be accomplished in a single connection/transaction with upgrade management server 104. In this example, upon detection of a problem "x" (as shown at block 164), computer system 102 connects to upgrade management server 104 in much the same was as was previously illustrated in FIG. 3A. An upgrade (e.g., FIX-x) appropriate to solve problem "x" is identified on upgrade management server 104. However, in this instance, upgrade management application 115 on upgrade management server 104 performs additional analysis. First, as shown at block 166, an analysis is performed of the environment in which computer system 102 operates. This includes an evaluation of the current inventory of hardware, software and upgrades of the computer system 102 against the latest product and upgrade levels available on the upgrade management server 104 (i.e., application of standard selection policies as described in FIG. 2, element 176). Upgrade management application 115 then creates a list of recommended upgrades for computer system 102 based on the environment changes, rules for error and performance triggers, and compatibility of products and levels (i.e., application of remote modification policies 178), as shown at block 168.

In this example, compatibility rules present in the upgrade management application 115 determine that FIX-x will cause compatibility problems with the current levels of software currently installed on computer system 102. As a result, upgrade management application will either: a) not download/install FIX-x, or b) download FIX-x, but also download another upgrade (e.g., FIX-y) that resolves the compatibility problem. Upgrade management application 115 also determines, via a performance trigger generated on computer system 102, that the performance of computer system 102 has fallen below a minimal acceptable standard. As a result, an additional upgrade (e.g., FIX-z) is downloaded/installed along with other upgrades during this single maintenance operation, as shown at block 169. While the prior art maintenance operation of FIG. 3A required three separate connection/download operations between computer system 102 and upgrade management server 104, the present invention can complete all upgrade maintenance analysis in a single operation, saving considerable time and operator resource. Thus, the present invention automates many interrelated and interdependent operations via rules and other logic that evaluates the appropriate aspects of the system environment, determines all appropriate actions related to upgrade management and invokes these actions to complete the process of analysis and execution of a highly customized upgrade management strategy.

Figure 4:
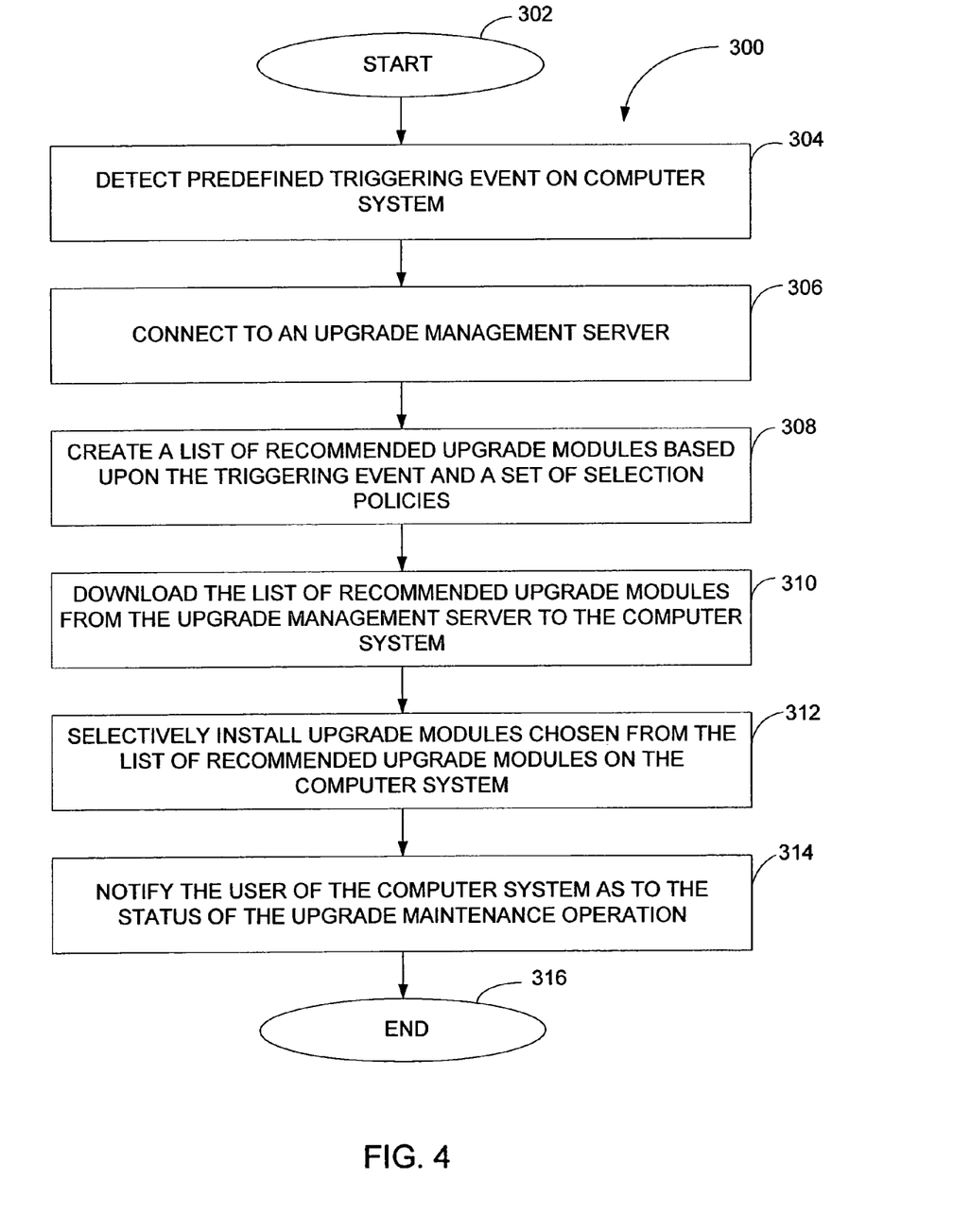
FIG. 4 illustrates a preferred method for autonomically applying maintenance upgrades to a computer system in accordance with the present invention.

FIG. 4 illustrates a preferred method for autonomically applying maintenance upgrades to a computer system in accordance with the present invention, shown generally at 300. The method begins at block 302. At block 304, a predefined triggering event is detected on a computer system, the triggering event indicative of a potential maintenance issue. At block 306, the computer system connects to an upgrade management server, which may contain an upgrade relevant to the triggering event. At block 308, a list of recommended upgrade modules is created on the upgrade management server, based upon the triggering event and a set of selection policies. At block 310, this list of recommended upgrade modules (and, potentially, the modules themselves) is then downloaded from the upgrade management server to the computer system. At block 312, the list of recommended upgrade modules on the computer system is selectively installed on the computer system. At block 314, the user of the computer system is notified of the status of the upgrade maintenance operation. At block 316, the method ends.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. A method for providing autonomic, event-driven upgrade maintenance of one or more software modules residing on a computer system, the method comprising:
   detecting a predefined triggering event on the computer system indicative of a potential maintenance issue, the predefined triggering event being triggered by a current operating condition of the computer system;
   connecting to an upgrade management server, based upon a set of user defined policies residing on the computer system;
   creating on the upgrade management server a list of recommended upgrade modules to download to the computer system, the list based upon a set of selection policies;
   downloading a set of recommended upgrade modules from the upgrade management server to the computer system; and
   selectively installing upgrade modules chosen from the set of recommended upgrade modules downloaded to the computer system, based upon the set of user defined policies residing on the computer system.

2. The method of claim 1, wherein the method further comprises the step of:
   notifying a user of the status of the upgrade maintenance operation.

3. The method of claim 1, wherein the predefined triggering event comprises a change to the hardware configuration of the computer system.

4. The method of claim 1, wherein the predefined triggering event comprises a change to the software configuration of the computer system.

5. The method of claim 1, wherein the predefined triggering event comprises exceeding a predefined error threshold on the computer system.

6. The method of claim 1, wherein the predefined triggering event comprises exceeding a predefined performance threshold on the computer system.

7. The method of claim 1, wherein the predefined triggering event comprises exceeding a predefined elapsed time since the last connection to the upgrade management server.

8. The method of claim 1, wherein the steps of connecting to a upgrade management server and selectively installing the list of recommended upgrade modules are controlled by a set of user defined policies.

9. The method of claim 8, wherein the set of user defined policies includes a preferred connection time.

10. The method of claim 8, wherein the set of user defined policies includes the connection resource to be used.

11. The method of claim 8, wherein the set of user defined policies includes the specification of computer system areas/software products to enable automatic application of upgrades.

12. The method of claim 8, wherein the set of user defined policies includes a defined time to connect to the upgrade management server to check for upgrades.

13. The method of claim 8, wherein the set of user defined policies includes a defined elapsed time interval for connecting to the upgrade management server to check for upgrades.

14. The method of claim 8, wherein the set of user defined policies includes a notification list for e-mailing user of information and actions relative to the upgrade management process.

15. The method of claim 8, wherein the set of user defined policies include a list of one or more upgrade management servers to be used for the upgrade management process.

16. The method of claim 1, wherein the one or more computer software modules comprises software applications.

17. The method of claim 1, wherein, the one or more computer software modules comprises operating systems.

18. The method of claim 1, wherein the one or more computer software modules comprises device drivers for installed hardware components.

19. The method of claim 1, wherein the set of selection policies is sent from the computer system to the upgrade management server.

20. The method of claim 19, wherein the set of selection policies includes creating the list of recommended upgrade modules based upon a specific set of upgrades requested by the computer system.

21. The method of claim 19, wherein the set of selection policies includes comparing a revision levels of the one or more software modules residing on the computer system against a revision levels of one or more software modules residing on the upgrade management server.

22. The method of claim 19, wherein the set of selection policies includes creating the list of recommended upgrade modules by identifying modules associated with a hardware change on the computer system.

23. The method of claim 19, wherein the set of selection policies includes creating the list of recommended upgrade modules by identifying software modules associated with a software change on the computer system.

24. The method of claim 19, wherein the set of selection policies includes creating the list of recommended upgrade modules by identifying upgrades specifically associated with an error triggering event on the computer system.

25. The method of claim 19, wherein the set of selection policies includes creating the list of recommended upgrade modules by identifying upgrades specifically associated with a performance triggering event on the computer system.

26. The method of claim 19, wherein the set of selection policies includes creating the list of recommended upgrade modules by analyzing a problem history provided by the computer system.

27. The method of claim 19, wherein the set of selection policies includes creating the list of recommended upgrade modules by identifying compatible revision levels between two or more software modules included within the list of modules.

28. The method of claim 1, wherein the step of downloading the list of recommended upgrade modules from the upgrade management server to the computer system further comprises the step of downloading the upgrade modules themselves from the upgrade management server to the computer system.

29. The method of claim 1, wherein the step of selectively installing upgrade modules chosen from the list of recommended upgrade modules on the computer system further comprises the step of downloading any upgrade modules chosen from the list of recommended upgrade modules from the upgrade management server to the computer system prior to the install.

30. A computer-readable program stored on a computer-readable storage medium, said computer readable program being configured to perform the steps of:

detecting a predefined triggering event on a computer system indicative of a potential maintenance issue, the predefined triggering event being triggered by a current operating condition of the computer system;

connecting to an upgrade management server, based upon a set of user defined policies residing on the computer system;

creating on the upgrade management server a list of recommended upgrade modules to download to the computer system, the list based upon a set of selection policies;

downloading a set of recommended upgrade modules from the upgrade management server to the computer system; and selectively installing upgrade modules chosen from the set of recommended upgrade modules downloaded to the computer system, based upon the set of user defined policies residing on the computer system.

31. The computer-readable program of claim 30, wherein the computer-readable program further includes the step of:

notifying a user of the status of the upgrade maintenance operation.

32. The computer-readable program of claim 30, wherein the predefined triggering event comprises a change to the hardware configuration of the computer system.

33. The computer-readable program of claim 30, wherein the predefined triggering event comprises a change to the software configuration of the computer system.

34. The computer-readable program of claim 30, wherein the predefined triggering event comprises exceeding a predefined error threshold on the computer system.

35. The computer-readable program of claim 30, wherein the predefined triggering event comprises exceeding a predefined elapsed time since the last connection to the upgrade management server.

36. The computer-readable program of claim 30, wherein the steps of connecting to a upgrade management server and selectively installing the list of recommended upgrade modules are controlled by a set of user defined policies.

37. The computer-readable program of claim 36, wherein the set of user defined policies includes a preferred connection time.

38. The computer-readable program of claim 36, wherein the set of user defined policies includes the connection resource to be used.

39. The computer-readable program of claim 36, wherein the set of user defined policies includes the specification of computer system areas/software products to enable automatic application of upgrades.

40. The computer-readable program of claim 36, wherein the set of user defined policies includes a defined time to connect to the upgrade management server to check for upgrades.

41. The computer-readable program of claim 36, wherein the set of user defined policies includes a defined elapsed time interval for connecting to the upgrade management server to check for upgrades.

42. The computer-readable program of claim 36, wherein the set of user defined policies includes a notification list for e-mailing user of information and actions relative to the upgrade management process.

43. The computer-readable program of claim 36, wherein the set of user defined policies include a list of one or more upgrade management servers to be used for the upgrade management process.

44. The computer-readable program of claim 30, wherein the set of selection policies is sent from the computer system to the upgrade management server.

45. The computer-readable program of claim 44, wherein the set of selection policies includes creating the list of recommended upgrade modules based upon a specific set of upgrades requested by the computer system.

46. The computer-readable program of claim 44, wherein the set of selection policies includes comparing a revision level of the one or more software modules residing on the computer system against a revision level of one or more software modules residing on the upgrade management server.

47. The computer-readable program of claim 44, wherein the set of selection policies includes creating the list of recommended upgrade modules by identifying modules associated with a hardware change on the computer system.

48. The computer-readable program of claim 44, wherein the set of selection policies includes creating the list of recommended upgrade modules by identifying software modules associated with a software change on the computer system.

49. The computer-readable program of claim 44, wherein the set of selection policies includes creating the list of recommended upgrade modules by identifying upgrades specifically associated with an error triggering event on the computer system.

50. The computer-readable program of claim 44, wherein the set of selection policies includes creating the list of recommended upgrade modules by identifying upgrades specifically associated with a performance triggering event on the computer system.

51. The computer-readable program of claim 44, wherein the set of selection policies includes creating the list of recommended upgrade modules by analyzing a problem history provided by the computer system.

52. The computer-readable program of claim 44, wherein the set of selection policies includes creating the list of recommended upgrade modules by identifying compatible revision levels between two or more software modules included within the list of modules.

53. A method for deploying computing infrastructure, comprising integrating computer-readable code into a computing system, wherein the code in combination with the computing system is capable of providing autonomic, event-driven upgrade maintenance of one or more software modules residing on a computer system, the method comprising the steps of:
    detecting a predefined triggering event on a computer system indicative of a potential maintenance issue, the predefined triggering event being triggered by a current operating condition of the computer system;
    connecting to an upgrade management server, based upon a set of user defined policies residing on the computer system;
    creating on the upgrade management server a list of recommended upgrade modules to download to the computer system, the list based upon a set of selection policies;
    downloading a set of recommended upgrade modules from the upgrade management server to the computer system; and
    selectively installing upgrade modules chosen from the set of recommended upgrade modules downloaded to the computer system, based upon the set of user defined policies residing on the computer system.

* * * * *

UNITED STATES PATENT AND TRADEMARK OFFICE
CERTIFICATE OF CORRECTION

PATENT NO.       : 7,624,393 B2                                   Page 1 of 1
APPLICATION NO.  : 10/665656
DATED            : November 24, 2009
INVENTOR(S)      : Egan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1633 days.

Signed and Sealed this

Twenty-sixth Day of October, 2010

David J. Kappos
*Director of the United States Patent and Trademark Office*